(12) United States Patent
Sanders et al.

(10) Patent No.: US 10,622,834 B2
(45) Date of Patent: Apr. 14, 2020

(54) VIRTUAL POWER PLANT

(71) Applicant: Sunverge Energy, Inc., San Francisco, CA (US)

(72) Inventors: Dean Sanders, Linden, CA (US); Stu Statman, San Francisco, CA (US)

(73) Assignee: Sunverge Energy, Inc., San Francisco, CA (US)

(*) Notice: Subject to any disclaimer, the term of this patent is extended or adjusted under 35 U.S.C. 154(b) by 0 days.

(21) Appl. No.: 16/125,406

(22) Filed: Sep. 7, 2018

(65) Prior Publication Data

US 2019/0288555 A1   Sep. 19, 2019

Related U.S. Application Data

(63) Continuation of application No. 15/197,526, filed on Jun. 29, 2016, now abandoned, which is a
(Continued)

(51) Int. Cl.
*G05B 15/02* (2006.01)
*G05B 11/01* (2006.01)
(Continued)

(52) U.S. Cl.
CPC ............. *H02J 15/00* (2013.01); *G05B 15/02* (2013.01); *H02J 3/14* (2013.01); *H02J 3/32* (2013.01); *H02J 3/381* (2013.01); *H02J 3/383* (2013.01); *H02J 7/35* (2013.01); *H02J 13/0006* (2013.01); *Y02B 70/3225* (2013.01); *Y02E 10/563* (2013.01); *Y02E 10/566* (2013.01);
(Continued)

(58) Field of Classification Search
CPC .. G05B 15/02; H02J 13/0006; H02J 13/0079; H02J 15/00; H02J 3/14; H02J 3/32; H02J 3/381; H02J 3/382; H02J 3/383; H02J 7/35; Y02B 70/3225; Y02E 10/563; Y02E 10/566; Y02E 60/721
See application file for complete search history.

(56) References Cited

U.S. PATENT DOCUMENTS 8,457,797 B2   6/2013   Imes et al.
8,682,495 B2   3/2014   Carralero et al.
(Continued)

FOREIGN PATENT DOCUMENTS

WO   WO 2014164976   10/2014
WO   WO 2015017201   2/2015

OTHER PUBLICATIONS

Extended European Search Report and Written Opinion issued by the European Searching Authority dated Feb. 25, 2019 for EP Application No. EP 16821841.0. pp. 1-19.
(Continued)

*Primary Examiner* — Abdelmoniem I Elamin
(74) *Attorney, Agent, or Firm* — Haynes and Boone, LLP

(57) ABSTRACT

A virtual power plant is presented. A virtual power plant couples to one or more virtual power plant units that provide power and/or storage of power to a power grid. In some embodiments, a method of operating a virtual power plant includes receiving a request from a requester; determining whether the request can be performed by a set of units; reporting the result to the requester; and if a subsequent execution request is received from the requester, then executing the request.

20 Claims, 8 Drawing Sheets

Related U.S. Application Data continuation of application No. 14/791,420, filed on Jul. 4, 2015, now Pat. No. 9,960,637.

(51) Int. Cl.
| | |
|---|---|
| *G05B 15/00* | (2006.01) |
| *H02J 13/00* | (2006.01) |
| *H02J 15/00* | (2006.01) |
| *H02J 3/14* | (2006.01) |
| *H02J 3/32* | (2006.01) |
| *H02J 3/38* | (2006.01) |
| *H02J 7/35* | (2006.01) |

(52) U.S. Cl.
CPC ............ *Y02E 60/721* (2013.01); *Y02E 70/30* (2013.01); *Y02T 90/168* (2013.01); *Y04S 10/126* (2013.01); *Y04S 20/222* (2013.01); *Y04S 30/12* (2013.01)

(56) References Cited

U.S. PATENT DOCUMENTS

| | | | |
|---|---|---|---|
| 8,855,829 B2 | 10/2014 | Golden et al. | |
| 8,918,225 B2* | 12/2014 | Lazaris | H02J 3/382 290/44 |
| 8,965,590 B2 | 2/2015 | Boardman et al. | |
| 9,094,385 B2 | 7/2015 | Akyol et al. | |
| 9,136,732 B2 | 9/2015 | Wolter | |
| 9,172,249 B2 | 10/2015 | Rockenfeller et al. | |
| 9,188,109 B2* | 11/2015 | Lazaris | F03G 6/00 |
| 9,263,894 B2* | 2/2016 | Robinett, III | H02J 3/38 |
| 9,529,349 B2 | 12/2016 | Marti et al. | |
| 9,576,472 B2 | 2/2017 | Koch | |
| 9,641,026 B2 | 5/2017 | Boardman et al. | |
| 9,722,813 B2 | 8/2017 | Benes et al. | |
| 9,733,623 B2 | 8/2017 | Yang et al. | |
| 9,795,048 B2 | 10/2017 | Simonelli et al. | |
| 9,853,488 B2 | 12/2017 | Fincham et al. | |
| 9,881,033 B2 | 1/2018 | Boardman et al. | |
| 2004/0024502 A1 | 2/2004 | Squires et al. | |
| 2004/0030457 A1 | 2/2004 | Bayoumi et al. | |
| 2004/0167677 A1 | 8/2004 | Weiss | |
| 2006/0158037 A1 | 7/2006 | Danley et al. | |
| 2008/0167756 A1 | 7/2008 | Golden et al. | |
| 2009/0088907 A1 | 4/2009 | Lewis et al. | |
| 2009/0276488 A1 | 11/2009 | Alstad | |
| 2010/0017249 A1 | 1/2010 | Fincham et al. | |
| 2011/0046800 A1 | 2/2011 | Imes et al. | |
| 2011/0106321 A1 | 5/2011 | Cherian et al. | |
| 2012/0101639 A1 | 4/2012 | Carralero et al. | |
| 2012/0130556 A1 | 5/2012 | Marhoefer | |
| 2012/0232709 A1* | 9/2012 | Robinett, III | H02J 3/38 700/286 |
| 2012/0310434 A1 | 12/2012 | Taft | |
| 2012/0310559 A1 | 12/2012 | Taft | |
| 2013/0015703 A1 | 1/2013 | Rouse et al. | |
| 2013/0036311 A1 | 2/2013 | Aykol et al. | |
| 2013/0041516 A1 | 2/2013 | Rockenfeller et al. | |
| 2014/0218209 A1 | 8/2014 | Koch | |
| 2015/0039145 A1 | 2/2015 | Yang et al. | |
| 2015/0105924 A1 | 4/2015 | Lazaris | |
| 2015/0105928 A1* | 4/2015 | Lazaris | H02J 3/382 700/295 |
| 2015/0127180 A1 | 5/2015 | Oh et al. | |
| 2015/0127685 A1 | 5/2015 | Boardman et al. | |
| 2015/0134135 A1 | 5/2015 | Wong et al. | |
| 2015/0254787 A1 | 9/2015 | Eger et al. | |
| 2015/0318706 A1 | 11/2015 | Ilinca et al. | |
| 2016/0020728 A1 | 1/2016 | Wolter | |
| 2016/0072289 A1* | 3/2016 | Lazaris | G06Q 30/0605 700/287 |
| 2017/0126012 A1 | 5/2017 | Grebel et al. | |
| 2017/0160711 A1 | 6/2017 | Wong et al. | |

OTHER PUBLICATIONS

International Search Report for PCT Application No. PCT/US2016/040530 issued by the U.S. Searching Authority dated Sep. 14, 2016, pp. 1-2.

Written Opinion for PCT Application No. PCT/US2016/040530 issued by the U.S. Searching Authority dated Sep. 14, 2016, pp. 1-10.

International Search Report for PCT Application No. PCT/US2016/040540 issued by the U.S. Searching Authority dated Sep. 15, 2016, pp. 1-2.

Written Opinion for PCT Application No. PCT/US2016/040540 issued by the U.S. Searching Authority dated Sep. 15, 2016, pp. 1-4.

International Search Report for PCT Application No. PCT/US2016/040545 issued by the U.S. Searching Authority dated Sep. 26, 2016, pp. 1-2.

Written Opinion for PCT Application No. PCT/US2016/040545 issued by the U.S. Searching Authority dated Sep. 26, 2016, pp. 1-7.

Zadeh, M.R.D.; A. Hajimiragha; M. Adamiak; A. Palizban; and S. Allan, "Design and implementaion of a microgrid controller," In Protective Relay Engineers, 2011 64$^{th}$ Annual Conference, pp. 137-145, IEEE, 2011.

Liu, Hai-xuan, "Studies on the monitoring and control platform of microgrids," In Electricity Distribution (CICED), China International Conference on, pp. 1-5, IEEE, 2012.

Gomis-Bellmnt, Oriol, Andreas Sumper, Alba Colet-Subirachs, Albert Ruiz-Alvarez, Felipe Alvarez-Cuevas-Figuerola, and Antoni-Sudria-Andreu, "A utility connected microgrid based on power emulators," In Power and Energy Society General Meeting, pp. 1-6, IEEE 2011.

Dimeas et al., "Microgrids Control Issues," In: "Microgrids" Dec. 26, 2013, John Wiley and Sons, Ltd., Chichester, United Kingdom, pp. 25-80.

European Search Report from European Patent Application No. 16821840.2, dated Mar. 22, 2019, pp. 1-11.

European Search Report from European Patent Application No. 16821841.0, dated Feb. 20, 2019, pp. 1-10.

European Search Report from European Patent Application No. 16821842.8, dated Mar. 29, 2019, pp. 1-9.

International Preliminary Report on Patentability from PCT/US2016/040530, dated Jan. 9, 2018, pp. 1-6.

International Preliminary Report on Patentability from PCT/US2016/040540, dated Jan. 9, 2018, pp. 1-5.

International Preliminary Report on Patentability from PCT/US2016/040545, dated Jan. 9, 2018, pp. 1-8.

Marra et al., "Implementation of an Electric Vehicle Test Bed Controlled by a Virtual Power Plant for Contributing to Regulating Power Reserves," 2012 IEEE Power and Energy Society General Meeting, San Diego, CA, Jul. 22-26, 2012, IEEE, Piscataway, NJ, Jul. 22, 2012, pp. 1-7.

Raab et al. "Virtual Power Plant Control Concepts with Electric Vehicles," Intelligent System Application to Power Systems (ISAP), 2011 16th International Conference on, IEEE, Sep. 25, 2011, pp. 1-6.

Zadeh et al. "Design and Implementation of a Microgrid Controller," Protective Relay Engineers, 2011 64th Annual Conference for IEEE, Apr. 11, 2011, pp. 137-145.

U.S. Appl. No. 14/791,420, filed Jul. 4, 2015, U.S. Pat. No. 9,960,637, May 1, 2018.

U.S. Appl. No. 15/197,526, filed Jun. 29, 2016.

U.S. Appl. No. 15/197,459, filed Jun. 29, 2016.

U.S. Appl. No. 15/197,537, filed Jun. 29, 2016.

\* cited by examiner

VIRTUAL POWER PLANT

RELATED APPLICATIONS

The present application is a continuation of U.S. patent application Ser. No. 15/197,526, filed Jun. 29, 2016, now abandoned, which is a continuation of U.S. patent application Ser. No. 14/791,420, filed on Jul. 4, 2015, now U.S. Pat. No. 9,960,637, issued on May 1, 2018, entitled "Renewable Energy Integrated Storage and Generation Systems, Apparatus, and Methods with Cloud Distributed Energy Management Services," by Dean Sanders and Stu Statman, each of which is herein incorporated by reference in its entirety.

TECHNICAL FIELD

Embodiments generally related to systems and methods for Virtual Power Plant operation of distributed power generation and storage assets.

DISCUSSION OF RELATED ART

There exists a number of site specific energy generation and back-up systems, often associated with individual commercial, residential sites, or field locations in current use or which are being developed for use. There exist several technologies that can produce electricity at a particular location. Such technologies include, for example, photovoltaic panels (e.g., solar panels); small scale natural gas turbines (also known as micro-turbines); small-scale wind turbines (in contrast to the large turbines used in grid connected wind farms); low pressure water turbines; high-pressure low flow water turbines; fuel cells using hydrogen, natural gas, and potentially other hydrocarbons; geothermal sources; energy scavenging devices; or conventional diesel, natural gas, gasoline, or other hydrocarbon generators. These technologies, used on residential, commercial, or other sites, can be referred to as "distributed energy sources." Distributed energy sources have been deployed only to a very limited extent for reasons of cost, convenience, and a lack of harmonized grid inter-connection standards. Historically, power storage and supply devices typically involve the charging of batteries that store energy in the event of a power failure of a main source of electricity at a particular site. Typically, the main source of power for a particular site is a utility power grid connected to the site (e.g. home or business), which is often designed to support the entire or selected electrical load required by a particular site. As a result, residential and commercial power storage and supply devices may be large and cumbersome. In some cases, the power storage and supply devices store the electric power produced by an alternative energy source and may even supply power to a utility power grid, in essence operating as a small, distributed power generation plant.

Such distributed power systems often provide back-up power for the established electrical grid to which it is attached and may include combinations of energy storage and energy generation. As discussed above, energy generation can include fueled generators (e.g., diesel, gasoline, natural gas, hydrogen, or generators using other fuels) as well as renewable (e.g., solar, wind, water, etc.). Storage can include battery storage from any available battery technology or other forms of mechanical storage (e.g., pumping of water to later be used in a water driven turbine). These distributed power systems may also receive and store power from the grid itself. Distributed power systems coupled to the power grid may operate with the power grid in a load shifting or load flattening mode in order to better utilize the power received from the grid.

As a result of multiple factors, including the increasing popularity of electric vehicles and the availability of an advanced metering infrastructure, the costs of implemented distributed power systems are decreasing and interests in distributed power systems is increasing. As these systems develop, there is an increasing interest in coordinating such distributed energy systems for better utilization.

Therefore, there is a need to develop better organizations for distributed energy systems.

SUMMARY

In accordance with aspects of the presents a virtual power plant. In some embodiments, a method of operating a virtual power plant includes receiving a request from a requester; determining whether the request can be performed by a set of units; reporting the result to the requester; and if a subsequent execution request is received from the requester, then executing the request.

A virtual power plant according to some embodiments includes a processor; a communications interface coupled to the processor, the communications interface configured to communicate with one or more virtual power plant units; a second communications interface coupled to the processor, the second communications interface configured to communicate with a requester; and a memory coupled to the processor, the memory storing data and instructions to be performed by the processor. The instructions executed by the processor provide instructions for receiving a request from a requester; determining whether the request can be performed by a set of units; reporting whether or not the request can be performed to the requester; and if a subsequent execution request is received to execute the request from the requester, then executing the request.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
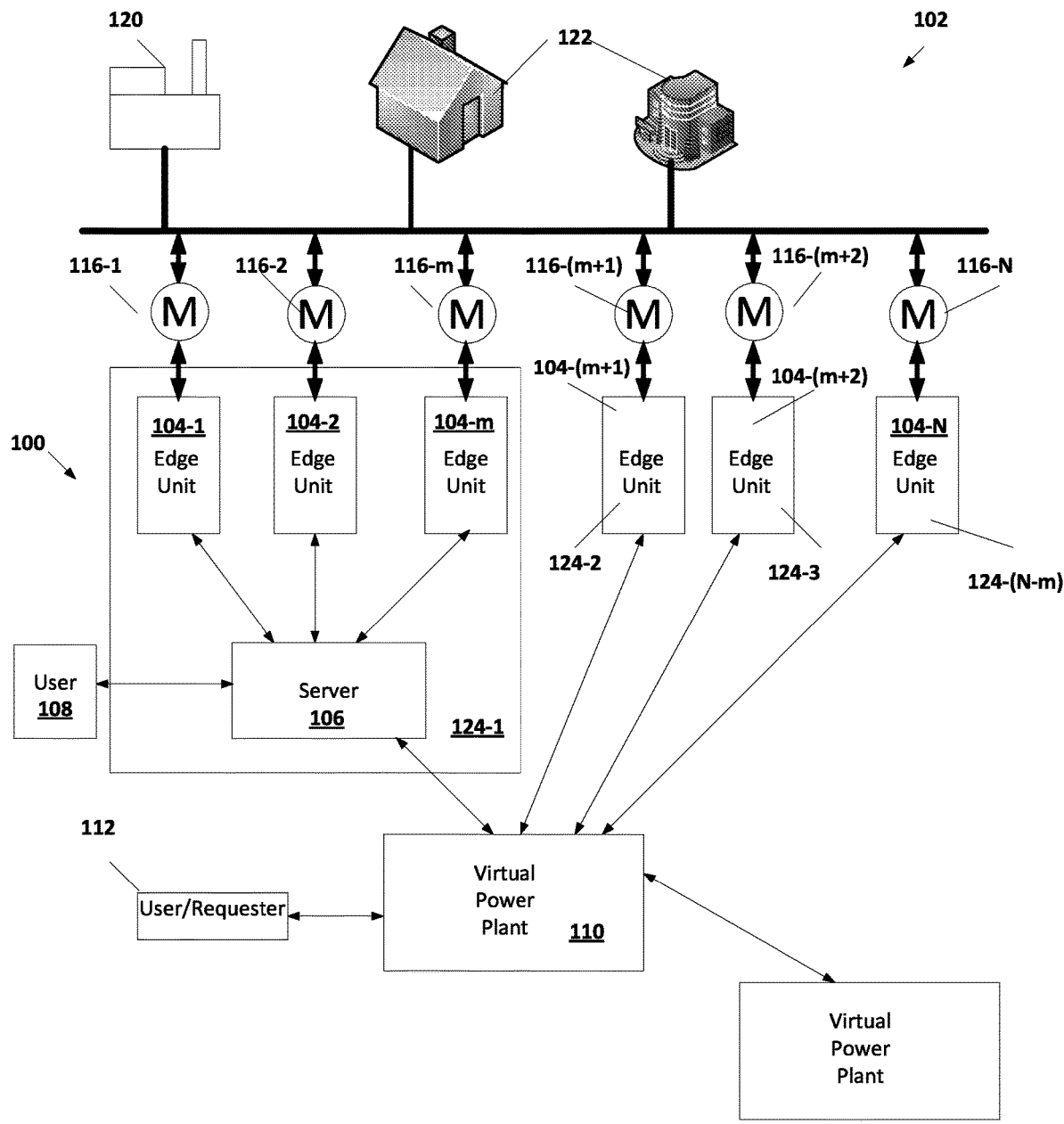
FIG. 1 illustrates an example of a system with a Virtual Power Plant (VPP) controlling a plurality of distributed power units according to some embodiments.

FIG. 1 illustrates an example power system 100 according to some embodiments. Power system 100 is an example of a group of distributed energy systems (DESs), shown as edge units 104-1 through 104-N, that are each separately coupled to a power grid 102. As such, power system 100 includes a plurality of edge units 104 (edge units 104-1 through 104-N are illustrated in FIG. 1). Edge units 104-1 through 104-N may be geographically separated and may each be associated with different residences, businesses, or other establishments.

Each of edge units 104 represents a DES that is coupled to receive and supply power to a power grid 102. In some embodiments, each of edge units 104 can be coupled to power grid 102 through a power meter 116 (power meters 116-1 through 116-N are illustrated in FIG. 1). Power meters 116 are supplied by a power company that controls grid 102 and may, for example, be smart meters. In some embodiments, power meters 116 may receive and send signals to an operator of power grid 102. In some embodiments, power meters 116 may provide signals to edge units 104 that allow control of certain aspects of edge units 104 by a power company through power meters 116.

In general, power grid 102 can be any power distribution system that receives power from power sources and provides power to power users. As shown in FIG. 1, power grid 102 receives power from power sources 120 and supplies power to power users 122. There can be any number of power sources 120 coupled to power grid 102. Power sources 120 can be, for example, commercial power plants including coil-fired plants, hydroelectric plants, geothermal plants, nuclear plants, gas-fired plants, solar production facilities, wind power facilities, individual generators or any other power production facility for the production of power. Furthermore, power system 100 may represent further power generation facilities 120 coupled to power grid 102. As illustrated in FIG. 1, power grid 102 is coupled to edge units 104, each of which may provide power to grid 102 or receive power from grid 102.

As is illustrated in FIG. 1, edge units 104 can be networked by being coupled to a server 106 or other network device such as virtual power plant 110, for example. Server 106 can also be a microgrid controller such as that described in U.S. patent application Ser. No. 15/197,537, which is filed concurrently with the present application and herein incorporated by reference in its entirety. Server 106 can provide monitor and control functions to individual ones of edge units 104. As illustrated in FIG. 1, edge units 104-1 through 104-$m$ are in communication with server 106. Any form of communication, including wired or wireless communications protocols, can be utilized between server 106 and edge units 104-1 through 104-$m$. As is illustrated in FIG. 1, server 106 may further communicate with a user 108 that may monitor and provide instructions to server 106. In some embodiments, server 106 may be coupled to another server. In general, a server such as server 106 can be coupled to any number of other servers and individual edge units 104.

In accordance with some embodiments, any number of edge units 104 or servers 106 may also be coupled to a virtual power plant (VPP) 110. VPP 110 provides individual instructions to individual units 124 (units 124-1 through 124-(N–m) are shown in FIG. 1. A unit 124 can be a single one of edge units 104 or may be a group that includes multiple ones of edge units 104. In particular, as shown in FIG. 1, unit 124-1 is formed by server 106 and edge units 104-1 through 104-$m$ while units 124-2 through 124-(N–m) are individual edge units 104-($m$+1) through 104-N.

As shown in FIG. 1, VPP 110 is in communication with server 106 and edge units 104-($m$+1)-104-N. Unit 124-1 is formed by server 106 and edge units 104-1 through 104-$m$ while units 124-2 through 124-(N–m) are formed by edge units 104-($m$+1) through 104-N, respectively. In general, a VPP unit 124 can include any single one of edge units 104 or any collection of edge units 104.

In general, VPP 110 receives power requests from user/requester 112 and, if that request can be satisfied by the resources represented by units 124, VPP 110 instructs units 124 in order to satisfy the power request. User/requester 112 may be, for example, a power company and may include an interface between VPP 110 and computing systems for a power company that controls power grid 102.

As is further illustrated in FIG. 1, VPP 110 may be in communication with another VPP 114. VPP 114 may provide requests to VPP 110 in order to fulfill a request that VPP 114 has received. In some embodiments, when VPP 110 receives a request from VPP 114, VPP 110 may operate similarly to server 106. A requester represents any device or user that provides a request to a VPP such as VPP 110 to store power from or provide power to a power grid 102.

Figure 2:
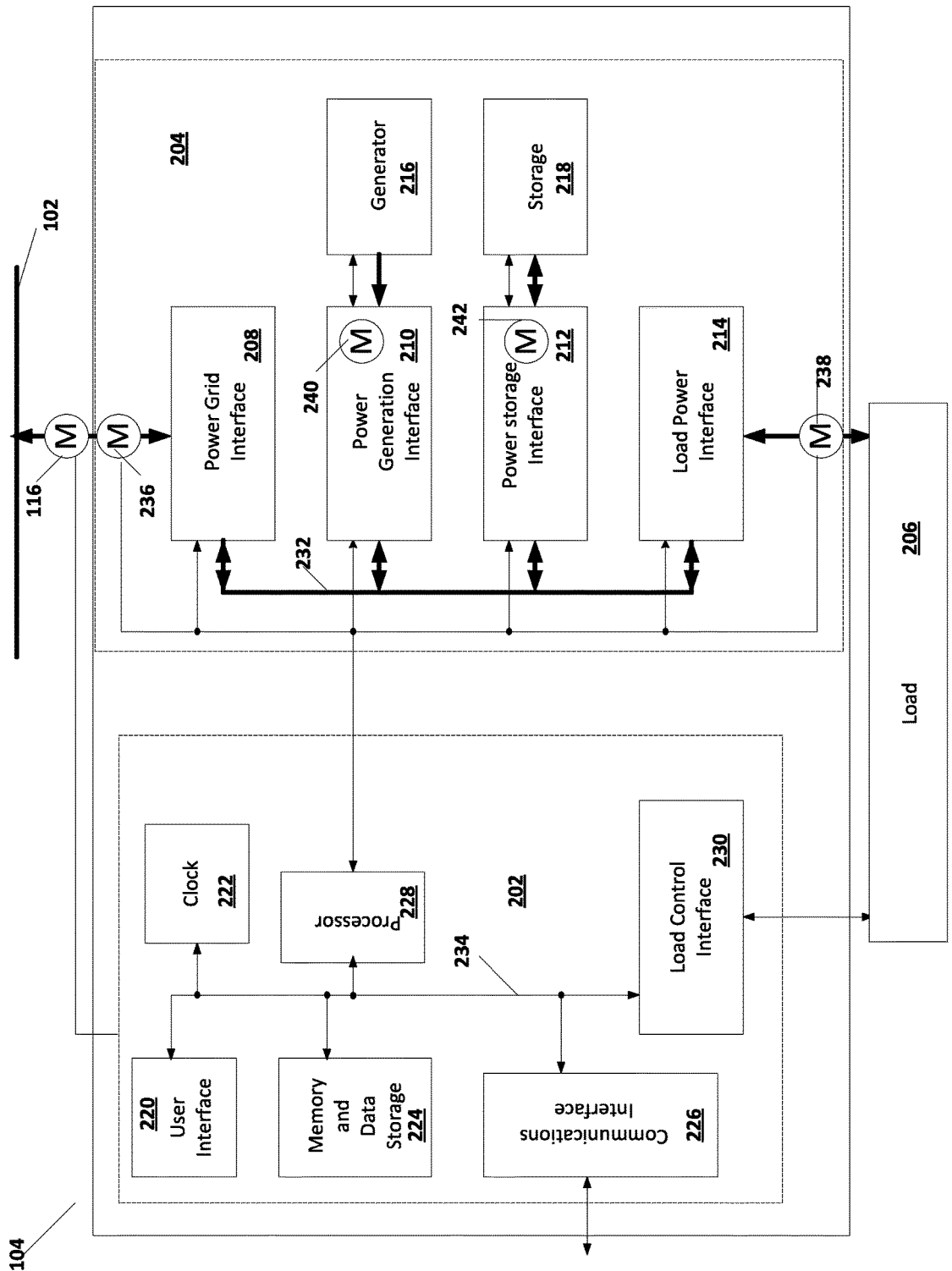
FIG. 2 illustrates an example of an edge unit as shown in FIG. 1.

FIG. 2 illustrates an example of an edge unit 104. As shown in FIG. 2, edge unit 104 includes a power distribution section 204 and a processing unit 202. Processing unit 202 controls and monitors components in power distribution section 204, as well as monitoring environmental properties such as door latches, temperature controls, humidity controls, or other components of edge unit 104. Power distribution section 204 includes interfaces for multiple power handling devices. As shown in FIG. 2, power distribution unit 204 includes a power grid interface 208 and one or more of a power generation interface 210, power storage interface 212, and load power interface 214. Power distribution unit 204 can further include a power bus 232 that links each of the power grid interface 208, power generation interface 210, power storage interface 212, and load power interface 214 that are present in power distribution section 204. Power bus 232 can be a collection of DC busses and AC busses, each with different voltage and current capabilities.

Power grid interface 208 transfers power between power grid 102 and power bus 232. When edge unit 104 supplies power to grid 102, power grid interface 208 receives power from bus 232 at an internal power voltage, which is set for edge unit 104, converts the power to be compatible with grid 102, and provides the power to grid 102. In some embodiments, power bus 232 represents one or more individual power busses that each may carry different DC or AC voltages. When edge unit 104 is receiving power from power grid 102, power grid interface 208 converts power from grid 102 to be compatible with an internal voltage of bus 232 that is appropriate for the device that is receiving the power.

Power generation interface 210 interfaces between power generator 216 and power bus 232. Power generator 216 may be any source of power, for example an internal-combustion generator (diesel, gas, natural gas, hydrogen, etc.), fuel cells, solar panels, wind power, hydroelectric, or any other power source. In some embodiments, edge unit 104 may include multiple generators 216, in which case power generation interface 210 will interface any number of individual generators included in generator 216 to power bus 232. Each individual generator in generator 216 may have a dedicated and individual interface circuit in power generation interface 210.

Power storage interface 212 interfaces between an energy storage device 218 and bus 232. Storage device 218 can be any device, or combination of devices, capable of storing energy, for example batteries, mechanical storage devices (compressed air, pumped water, etc.), heat storage device, or other device designed to store energy for future retrieval. Power storage interface 212 then converts the stored energy in storage device 218 to supply power to bus 232. Power storage interface 212 further receives power from bus 232 and stores energy in storage device 218.

Load power interface 214 provides power from bus 232 to a load 206. Load 206 may, for example, be a house, business, apartment complex, telecommunications tower, hospital, or any other power user. In some embodiments, individual components of load 206 can be activated or deactivated by external signals. For example, in a house certain appliances (e.g., hot water heater, air conditioning, etc.) may be enabled or disabled to adjust the use power. Consequently, load 206 may be adjustable. In some embodiments, meter 116 provides signals to control appliances in load 206.

Interfaces 208, 210, 212, and 214 include power circuitry such as power inverters, DC-DC converters, AC-DC converters, and other electronics for power conversion between individual interfaces and between edge unit 104 and power grid 102 or load 206. Interfaces may further include metering systems to accurately monitor power flow throughout unit 104. As shown in FIG. 2, meter 236 can provide accurate measure of power between grid 102 and unit 104, specifically through power grid interface 208. Power meter 238 provides an accurate measure of power through load power interface 214 and load 206. Similarly, power generation interface 210 can include a meter 240 to monitor power flow from generator 216 and power storage interface 212 can include a meter 242 to monitor power flow between bus 232 and storage 218. Power meters 236, 238, 240, and 242 can provide signals to processing unit 202.

The depiction of power distribution section 204 illustrated in FIG. 2 is provided for discussion only. Other configurations may be provided in order to facilitate the transmission and storage of power from individual power sources or energy storage devices to power grid 102 and/or load 206. Power distribution section 204 may, for example, not include generation or storage capability. As such, power distribution section 204 can be characterized in terms, for example, of the amount of energy storage capability, the current level of storage available, the charge and discharge characteristics of storage 218, the amount of power generation capable, and the future ability to produce power (e.g., the amount of fuel in a generator, the current production from solar panels or wind generators, the projected production from solar panels, wind generators, and other conditionally dependent sources, or other factors that affect the ability to produce power). As such, each edge unit 104 can be characterized by a set of characterization parameters that describe the storage capabilities and production capabilities of the edge unit 204. Consequently, each VPP unit 124 can be characterized by a set of characterization parameters as well.

As illustrated in FIG. 2, power distribution section 204 can provide signals to and be controlled by processor unit 202. Processor unit 202 includes a processor 228. Processor 228 may be coupled through a bus 234 to memory and data storage 224 and user interface 270. Processor 228 can be any processor, microprocessor or series of processors or microprocessors that are capable of executing instructions. Memory and data storage 224 can be any collection of volatile or non-volatile memory, disk drives, read-only media, magnetic drives, or other media for storing data and instructions that can be executed by processor 228. User interface 270 may be any combination of display and user input, may be a port into which a separate device is coupled (e.g., a USB port or other such port), or may be a combination of such so that a user at edge unit 104 may provide local instructions or review the status of edge unit 104. In some embodiments, user interface 220 may also be coupled to receive signals from a smart meter such as meter 116. In some embodiments, a clock 222 may also be coupled to processor 228 through data bus 234 in order to provide accurate timing according to a standard so that all edge units 104 are operating on a uniform time. Clock 222 may, for example, provide accurate times that can be used to activate processes for the production and storage of power within power distribution 204.

Processor 228 is further coupled to a communications interface 226 for communications with other networked devices, for example a server such as server 106 or a VPP such as VPP 110. As such, communications interface 226 may be configured to communicate over a wireless or wired network and may use any communications protocol. In some embodiments, communications interface 226 may communicate with a server 106 or VPP 110 over the internet, e.g. through the cloud, through a wired or wireless protocol.

Processor 228 is further coupled to a load control interface 230. Load control interface 230 may provide signals to load 206 that affect the power usage of load 206. For example, in some examples of edge unit 104, load 206 may have appliances that can be remotely activated or deactivated by signals from processor 228 through load control interface 230. The power usage of load 206 may then be controlled, or disabled completely, by processor 228. In some embodiments, processor 228 may turn appliances on and off in load 206 in order to better control the use of power within edge unit 104 and allow edge unit 104 to execute a set of instructions that it receives. Load shifting and load shaping may, for example, be accomplished in edge unit 104 by judiciously enabling or disabling appliances such as, for example, hot water heaters, car chargers, or other appliances in load 206.

As illustrated in FIG. 2, processor unit 202 is coupled to receive and provide signals to power distribution section 204. Processor unit 202 may control power distribution section 204 to route power to power grid 102, to load 206, to provide or halt generation of power from any one of the generators in generator 216, to store energy or receive energy to storage 218.

Edge unit 104 can be characterized with a set of characteristic parameters and current state parameters that are provided to other components of the network, for example VPP 110. The set of characteristic parameters can include, for example, total energy storage, generation capability, types of power generation, fuel levels for power generators, load characteristics, energy storage charging/discharging characteristics, energy storage capacity, efficiency characteristics, parasitic loss characteristics, controllability characteristics of power distribution components, characteristics of load controllability, power dispatch characteristics, power charge characteristics, among other parameters. Current state parameters can include current energy storage, current power generation, current load requirements, current power output to the grid, current loses, and other parameters.

Figure 3:
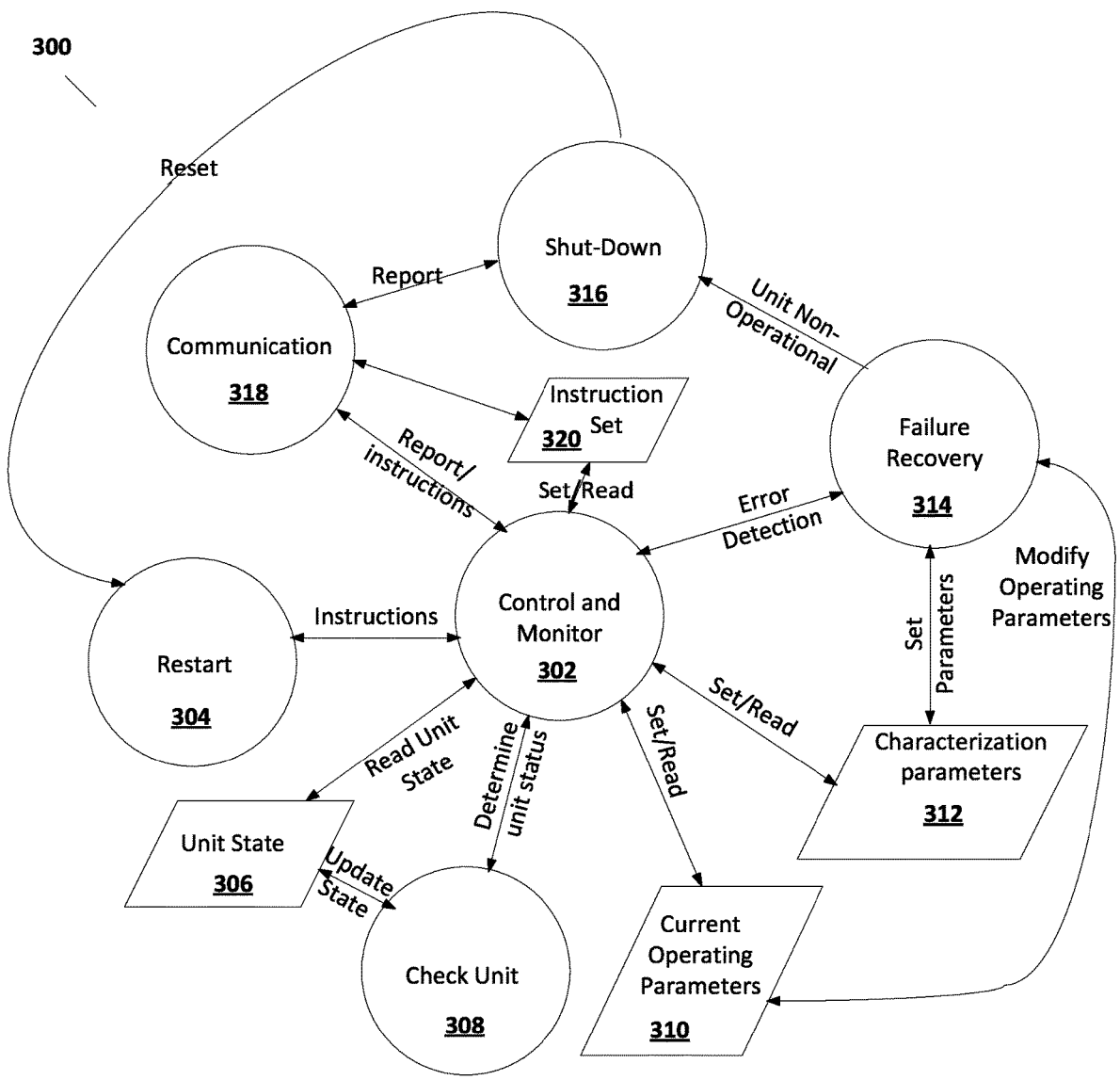
FIG. 3 illustrates operation of an edge unit as shown in FIG. 2.

FIG. 3 depicts an example state function 300 illustrating operation of processing unit 202 of an edge unit 104. The state diagram 303 illustrated in FIG. 3 illustrates various states, which can in some examples be operating simultaneously. Some or all states may continuously operate while edge unit 104 is in operation.

For example, the instruction set may include instructions to perform certain operations starting at certain times and having a duration of specific times, for example to discharge a certain power level to power grid 102 starting at a specific time and ending at a specific time, or storing energy during a particular time frame, or generating power within a certain time period for storage or for supply to the grid, among other operations. Control and monitor 302 determines the operating parameters stored in current operating parameters data 310 consistently with instructions set stored in data 320 and the characterization parameters stored in characterization parameters 312.

As discussed above, characterization parameters stored in characterization parameters data 312 can include total energy storage characteristics, total power generation statistics, load characteristics (including load control parameters), grid coupling characteristics, efficiency characteristics, and parasitic loss characteristics. Some example parameter sets are illustrated in the following table I below.

TABLE I

| Characterization Parameters | Operating parameters | Current Unit State |
|---|---|---|
| Total energy storage, energy storage rate characteristics, energy storage leakage characteristics. | Storage target level and storage rate. | Current energy storage, current energy storage rate. |
| Total generation capability by generation source (e.g., diesel, solar, wind, other). | Generation requirement by generation source (e.g., diesel, solar, wind, other). | Current power generation by generation source (e.g., diesel, solar, wind, other). |
| Load Characteristics, including characteristics of load controllability | Load parameters, settable load adjustment parameters. | Current Load drain. |
| Grid coupling characteristics (power available to grid, power receipt capabilities) Efficiency Characteristics Parasitic Loss Characteristics | Grid power settings | Current grid power |

As shown in FIG. 3, state function 300 includes a control and monitor state 302. In control and monitor state 302, processing unit 202 uses operating parameters read from data 310 and sends signals to power distribution section 204 according to those operating parameters to control individual devices (generators, storage units, output interfaces). Operating parameters can include, for example, power generation rate, storage rate, target storage level, load levels, grid power coupling levels, or other parameters used to control operation of the components of power distribution section 204. Operating parameters may be set by control and monitor 302 from instructions received from communication 318, which are stored in instruction set data 320, and may also depend on the current unit state read from unit state data 306.

Control unit 302 can receives instructions from a server 106, VPP 110, or other sources. In some embodiments, control unit 302 can determine from multiple sets of instructions a particular set to execute and may execute the chosen set of instructions. A more detailed description of edge unit 104, and operation of control unit 302, is described in U.S. patent application Ser. No. 15/197,459, which is concurrently filed with the present disclosure and herein incorporated by reference in its entirety.

The instruction set stored in data 320 can include a sequential set of steps that edge unit 104 is instructed to perform. The instruction set stored in data 320 can include storage target level and storage rate, generation requirements, load parameter settings, and grid coupling settings.

Efficiency Characteristics can include, for example, DC-DC loss through, for example, a solar charge controller (SCC), DC-AC loss (e.g., inverter loss), AC-DC loss (e.g., inverter loss), or other efficiency losses due to energy conversion that may occur in the system. Parasitic losses refer to losses that occur throughout the system.

As shown in FIG. 3, control and monitor 302 is coupled to read the current unit state from unit state data 306 and send signals to power generation section 204 in order to meet the operating parameters stored in current operating parameters 310. In performing that task, control and monitor 302 may rely on the characteristics of edge unit 104 to model and predict the operation of power generation section 204 in order to control particular components of power generation section 204.

In some embodiments, control and monitor 302 may transition to check unit 308, which may itself continuously operate. Check unit 308 measures the current parameters of power distribution section 204 in order to update unit state data 306. In some embodiments, check unit state 308 may continuously operate to periodically update the current state stored in unit state data 306. In some embodiments, check unit 308 may be triggered to update the data in unit state data 306 by control and monitor state 302.

Control and monitor state 302 is further coupled to transition to communications state 318 to receive instructions or to report conditions of edge unit 104. Communications state 318 includes communications through user interface 220 or through communications interface 226.

Communications through user interface 220, which is co-located with edge unit 104, allows a local operator or local device (such as meter 116, for example) to alter the operation of edge unit 104 by providing instructions to processor section 202. Communications through communications interface 226 allows edge unit 104 to receive operating instructions from a VPP such as VPP 110 or from a server such as server 106.

Communications state 318 may provide instructions to control and monitor 302 when instructions are received. The instructions may include requests to report the current state stored in unit state 306, the current operating parameters stored in operating parameters 310, or the characterization parameters stored in characterization parameters data 312. Control and Monitor state 302, upon request, sends the data for reporting to communication state 318. Further, communication state 318 may provide instructions to control and monitor state 302 to set new operating parameters in current operating parameters data 310. In such cases, control and monitor state 302 can set the requested operating parameters in current operating parameters data 310, provided they are consistent with the characterization parameters in characterization parameters data 312.

Additionally, communication state 318 may receive a set of instructions that provide multiple sets of instructions that are executed sequentially at specified times. In which case, control and monitor state 302 can reset the operating parameters of current operating parameters data 310 based on the sets of instructions stored in instruction set data 320 at the time specified by instruction set data 320.

In the event that an error in operation is detected in control and monitor state 302, then a transition to failure recover state 314 may result. Examples of errors that may occur include requiring operating parameters that exceed the characterizations of characterization parameters stored in data 312. Other examples include failure of devices, for example a power interface failure, power generation failure, storage failure, or other hardware failure in power distribution section 204. In failure recovery state 314, processor unit 202 determines whether a failure of a component of power distribution section 204 has occurred. If a failure has occurred, processor unit 202 may attempt to recover by resetting the individual component that produced the error. However, if no recovery of that component is possible, the processor unit 202 may adjust the characterization parameters stored in characterization parameters 312 to reflect the reduced capability of power distribution section 204 and return to control and monitor state 302 to continue operation of reduced capability of edge unit 104. Processor unit 202 may also adjust operating parameters to conform with the reduced capabilities reflected in the characterization parameters 312 and report the new characterization parameters out.

If the error is particularly severe, processor unit 202 may transition to a shut-down state 316. In shut-down state 316, a report is generated to communication state 318 to transmit a non-operational state to a server or VPP coupled to edge unit 104. Further, most, if not all, of components in power distribution section 204 can be turned off.

Shut-down state 316 may transition to restart 304 when an instruction to do so is received through communication 318. In some embodiments, a field technician may restart edge unit 104 from user interface 220 after repairing or replacing the component or components of power distribution section 204 that resulted in the error. In some cases, a request to restart, potentially with a reduced set of characterization parameters 312 and new set of operating parameters 310, may be received from a server or VPP through communications 318. In some embodiments, restart 304 may provide control and monitor 302 with a set of operating parameters for current operating parameters 310 which may be, for example, an idle or standby set. Once a restart is complete, control and monitor 302 may report characterization parameters stored in characterization parameters 312, operating parameters stored in current operating parameters 310, and the current state stored in unit state 306 through communications state 318.

In some embodiments, communication 318 may detect a lack of a communications link, for example to a server or a VPP. In some embodiments, when the communications link fails, edge unit 104 can continue to execute according to the instructions in instruction set data 320. In some embodiments, when the communication link fails, edge unit 104 can revert to a set of standard operating parameters and continue to function under the standard set or may transition to failure recovery 314, which may shut down edge unit 104 in shut down state 316.

Figure 4:
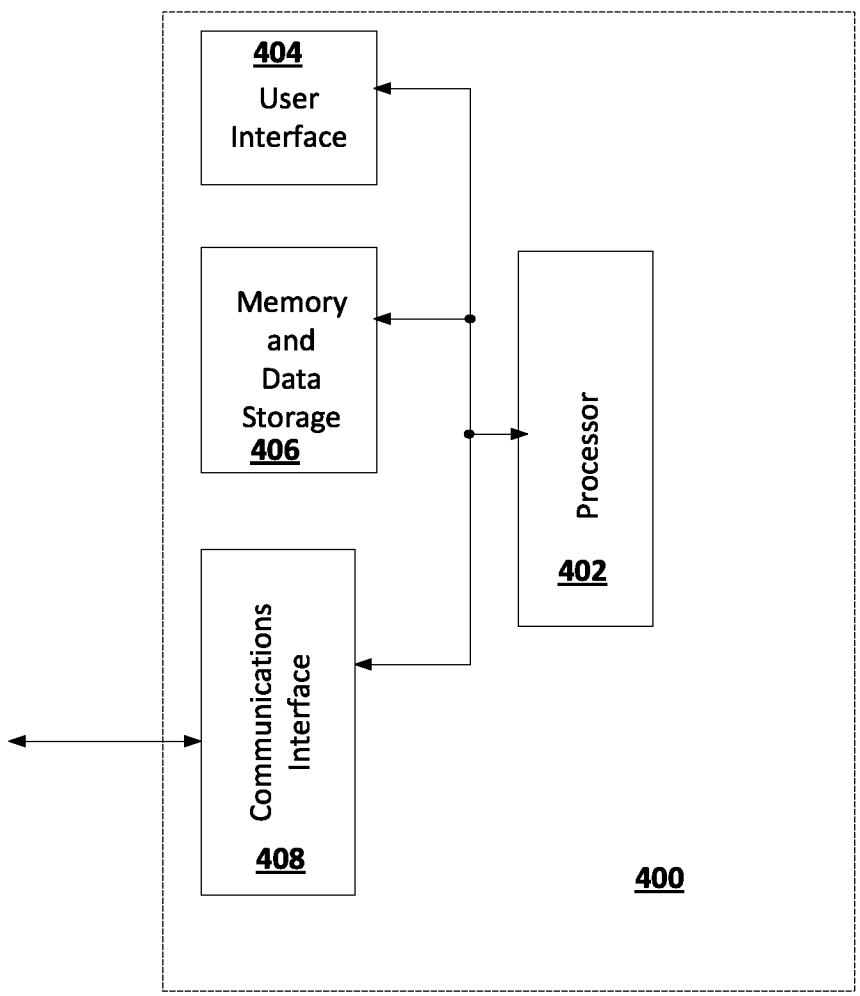
FIG. 4 illustrates an example of a server or VPP as illustrated in FIG. 1.

FIG. 4 illustrates an example of a device 400 that may be a server such as server 106 or a VPP such as VPP 110 or VPP 114. As shown in FIG. 4, device 400 includes a processor 402, a user interface 404, storage 406, and a communications interface 408. Processor 402 includes one or more microprocessors or other devices capable of executing instructions. User interface 404 may be any display and input combination, for example touchscreen, keyboard, display, or other devices or collection of devices that allow a user to interface with device 400. Memory and data storage 406 can include any combination of one or more data storage devices, for example volatile or non-volatile memory, magnetic or optical disk drives, or any other device capable of storing data. Memory and data storage 406 may further include removable media such as magnetic disks, magnetic tape, optical disks, or portable solid-state memory devices. Memory and data storage 406 may be used to store data and instructions executed by processor 402.

Communications interface 408 may be any interface that couples to any number of edge units 104, servers such as server 106, or VPPs such as VPP 110 or VPP 114. In some embodiments, communications interface 408 can couple to other devices through any combination of wireless interfaces, internet connectivity, physical wired networks, or through any other media utilizing any of the various protocols for data transmission available.

Figure 5:
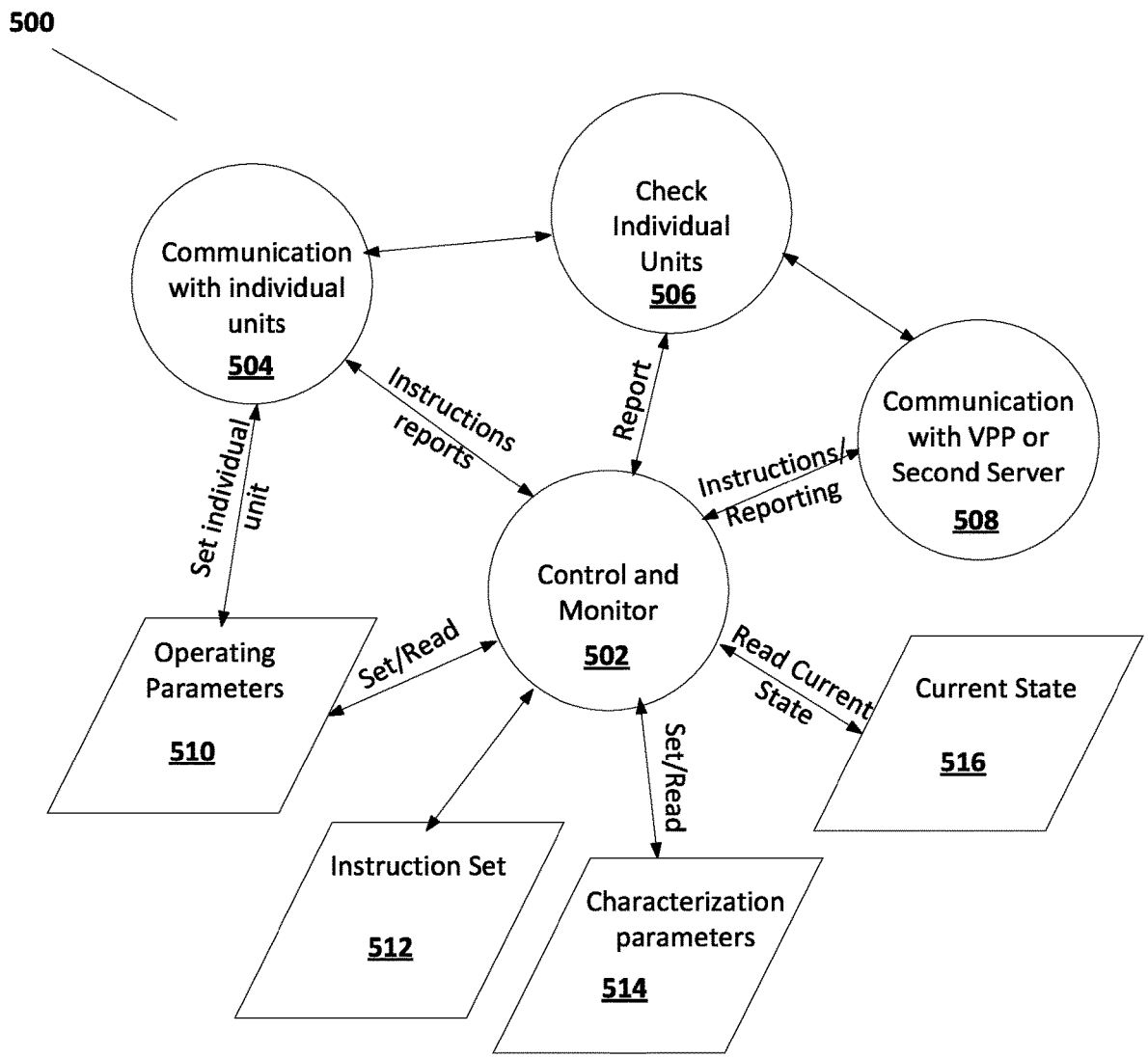
FIG. 5 illustrates operation of an example server as illustrated in FIG. 1.

FIG. 5 illustrates an example process 500 for operating device 400 as server 106. As illustrated in FIG. 5, process 500 may include a control and monitor state 502. Control and monitor state 502 determines the operating parameters stored in operating parameters data 210 for each of the edge units 104-1 through 104-m coupled to server 106 based on instructions received and stored in instruction set data 512. In some embodiments, server 106 and the edge units 104-1 through 104-m coupled to server 106 are considered a single VPP unit 124-1, as shown in FIG. 1. As such, control and monitor 502 determines a set of consolidated characterization parameters stored in characterization parameters data 514 for the consolidated set of edge units 104-1 through 104-m.

Control and monitor state 502 can interact with communications state 504 in order to provide instructions to individual ones of edge units 104-1 through 104-m and receive reports from each of edge units 104-1 through 104-m. Control and Monitor state 502 may transition to a check individual units state 506, which interacts with communications state 504 to query each of the individual edge units 104-1 through 104-m regarding their status. Control and monitor state 502 or check individual units 506 then updates the current state stored in current state data 516. The current state stored in data 516 can include the current state of each of edge units 104-1 through **104-*m* coupled to server 106 and may further include the consolidated state of a single VPP unit 124-1 that includes the edge units 104-1 through 104-*m***.

Control and monitor state 502 may further transition to communications state 508 that communicates with another server or with a VPP, for example VPP 110 as illustrated in FIG. 1. Control and monitor state 502 can provide reports through communication state 508 and receive instructions from communications state 508. In some embodiments, server 106 may receive instructions for each of the individual ones of edge units 104-1 through **104-*m* coupled to server 106, essentially treating each of edge units 104-1 through 104-*m* as an individual VPP unit. In some embodiments, server 106 may receive instructions for the consolidated collection of servers 104-1 through 104-*m*, in which case server 106 in control and monitor state 502 can determine the individual instructions for each of edge units 104-1 through 104-*m* based on the instructions for the consolidated unit 124-1. As such, instructions received through communication state 508, which may be individually targeted to individual ones of units 104-1 through 101-*m* or for the consolidated set of edge units 104-1 through 104-*m*, may be a sequential set of instructions and are stored in instruction set data 512**.

In control and monitor state 502, device 400 determines operating parameters stored in operating parameters 510 for each of edge units 104-1 through **104-*m* based on the instructions received and stored in instruction set 512. The instructions stored in instruction set 512 include a schedule of activities for the group of edge units 104-1 through 104-*m*, either individually or directed towards the conglomerate of all of the edge units, that are coupled to server 106. In some embodiments, control and monitor 502 may determine instructions for each of edge units 104-1 through 104-*m* based on instructions received for the conglomerate set of edge units 104-1 through 104-*m*. Control and monitor state 502 may also maintain characterization parameters stored in characterization parameters 514. Control and monitor state 502 further determines whether the current parameters to individual edge units 104-1 through 104-*m* are consistent with the characterization parameters stored in characterization parameters 514 and the current state stored in current state 516. If the instructions to any one of edge units 104-1 through 104-*m* cannot be performed because of an inconsistency with the current state or the characterization parameters for that unit, then control and monitor 502 may provide an error message to communication state 508** to prompt further instructions.

The characterization parameters stored in characterization parameters data 514 can include a set of characterization parameters as discussed above for each of edge unit 104-1 through **104-*m*. Further, control and monitor 502 may provide a consolidated set of characterization parameters that describe the capabilities of the consolidated set of edge units 104-1 through 104-*m*. In some embodiments, the consolidated set of characterization parameters may be reported on request to a VPP or other server, such as VPP 110, so that the consolidated set of edge units 104-1 through 104-*m*** may be treated as a single unit.

Control and monitor 502, along with check individual units 506, may further store the current state of each of edge units 104-1 through **104-*m* in current state data 516. Further, control and monitor state 502 may compile, from the current state of each of the edge units 104-1 through 104-*m*, the consolidated current state of the unit formed by consolidating the edge units 104-1 through 104-*m***.

Control and monitor 502 may provide reports to a VPP such as VPP 110 by transitioning to communication state 508. These reports include the characterization parameters stored in data 514, the current state parameters stored in data 516, the current instruction set stored in data 512, and the current operating parameters stored in data 510. These sets of parameters may include sets for each individual one of edge units 104-1 through **104-*m* that are coupled to server 106 or they may be consolidated parameters treating the group of edge units 104-1 through 104-*m* as a single unit 124-1**.

Figure 6:
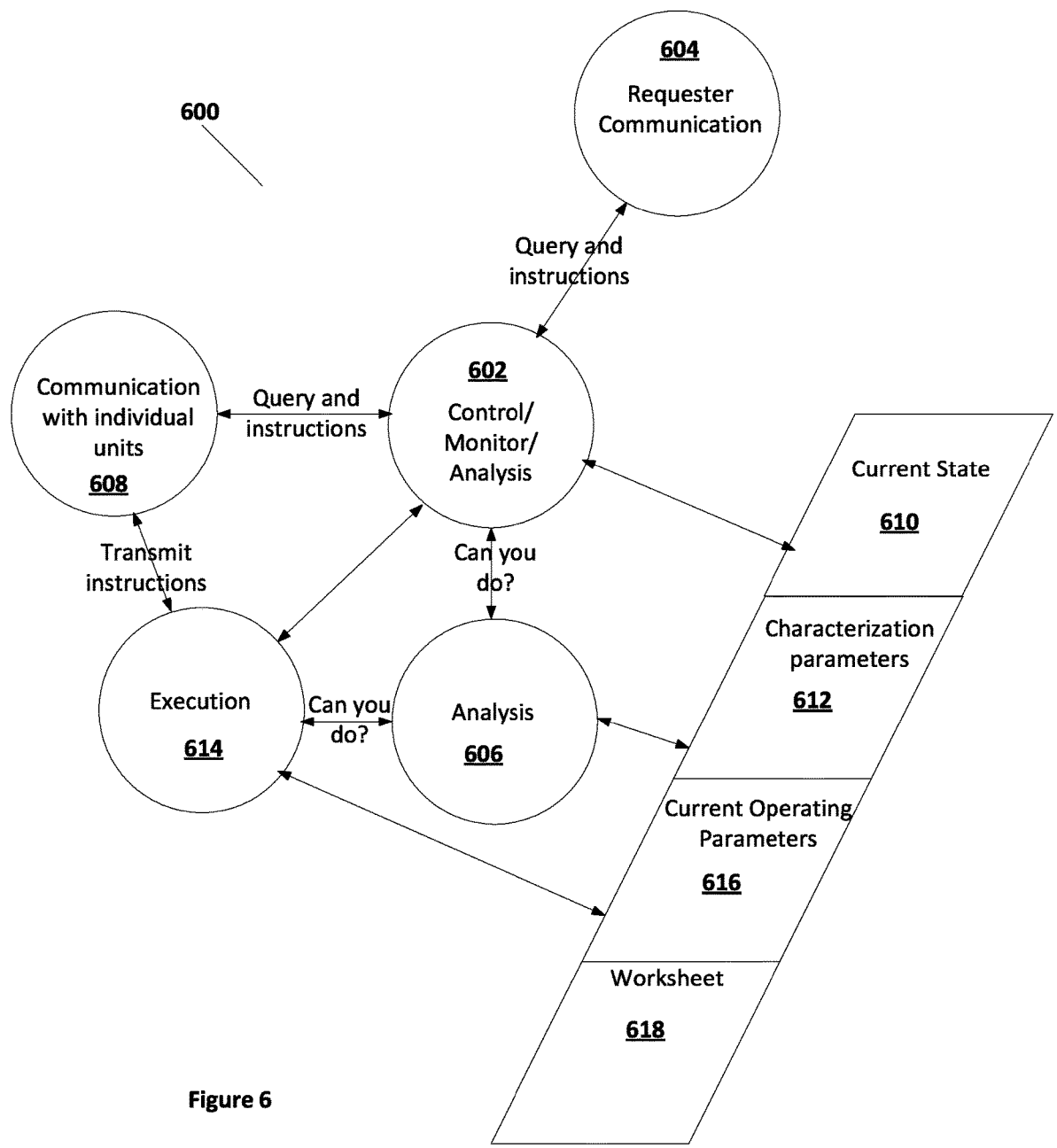
FIG. 6 illustrates operation of an example VPP as illustrated in FIG. 1.

FIG. 6 illustrates a state function 600 for a VPP such as VPP 110 shown in FIG. 1, for example, and can operate on a device 400 as illustrated in FIG. 4. Below, we discuss the operation of state function 600 as executed by VPP 110 as an example.

As shown in FIG. 6, VPP 110 is coupled to a number of units 124. VPP 110, as illustrated in FIG. 1, can be considered to be coupled to units 104-1 through 104-N, with units 104-1 through **104-*m* coupled through a server 106. In some embodiments, VPP 110 may consider a single consolidated unit 124-1 to include server 106 and units 104-1 through 104-*m*. VPP further considers units 124-2 through 124-(N−m), corresponding to edge units 104-(*m*+1) through 104-N, respectively, as other VPP units 124. In any case, each of the set of units 124 is characterized by a set of characterization parameters as described above with respect to individual edge units 104, stored in data 612. Further, each of the set of units 124 can have a current state described by a set of current state parameters stored in data 610. Further, each of the set of units 124 has a set of current operating parameters, which may be used to predict a future state of each of the units, stored in data 616**.

As illustrated in FIG. 6, a control state 602 is coupled to a communication state 608. Communication state 608 communicates with each one of units 124. Control state 602 can receive through communications state 608 the current state of each of units 124 and store the current state parameters in data 610, receive the current operating parameters of each of units 124 and store the current operating parameters in data 616, and receive characterization parameters from each of units 124 and store the characterization parameters in data 612. Further, changes in characterization parameters, current operating parameters, and the current state of units 124 can be reported through communications state 608 by VPP units 124 and stored by control state 602 in characterization parameters data 612, current operating parameters data 616, or current state data 610.

Control 602 is also coupled to requester communication 604. Requester communication 604 communicates with a requesting entity, which as shown in FIG. 4 can communication through user interface 404 directly to VPP 110 or through communication interface 408. The requesting entity requests that VPP 110 provide services to a power grid 102 according to certain timing. The request may include a sequence of charging and discharging events that are mandatory along with a series of discretionary events that should be performed by units 124 coupled to VPP 110. The requestor can provide an instruction set that includes a sequence of rules to be performed at certain times, each of the rules outlining whether the rule to be implemented is mandatory or permissive, the action to be taken, what time and duration the action is to be taken, and the priority level of the action (i.e., how critical is that particular action). As an example, the requests may be presented as a set of rules of the form {[must/may][do nothing/charge/discharge] at time T and hold for time t [w/priority p]}.

A set of example instructions is provided in the following Table II. When the schedule of instructions is received, VPP 110 can then transition from control state 602 to analysis state 606 to determine whether or not the set of rules in the schedule of instructions can be achieved by the set of units 124 coupled to VPP 110.

TABLE II

| Must | Discharge 10 kW | 02:00 | 30 minutes | High |
|---|---|---|---|---|
| May | Generate/charge | 24:00 | 2 hr | Low |
| Must | Store/charge 20 kW | 06:00 | <1 hr | High |
| Must | Discharge 15 kW | 12:00 | 1 hr | High |

In some embodiments, VPP 110 may receive updated reports from each of units 124 regarding their current state parameters to be stored in current state data 610, current operating parameters to be stored in current operating parameters data 616, or current characterization parameters to be stored in characterization parameters data 612 prior to transitioning to analysis state 606 so that the determination of the rule set can be current during the analysis. It should be noted that the characterization parameters stored in parameters 612 should not change except when there is a fault at a unit 124, as discussed above, as the characterization parameters described the overall capabilities and limitations of each of units 124.

In analysis state 606, VPP 110 generates a worksheet, stored in data 618, that fulfills the instructions request. Analysis state 606 provides a result that indicates whether the instructions can or cannot be met by the set of units 124. In some embodiments, analysis state 606 may provide an indication that the original request cannot be met, but an alternative set of rules that closely approximates the original set of required rules can be met by the set of units.

In analyzing whether or not the set of instructions presented by the requester can be executed, VPP 110 in analysis state 606 first determines whether the required actions can be achieved based on a comparison with the characterization parameters stored in data 612 and with the current state of each of units 124 stored in data 610. In some embodiments, analysis 606 may predict the state of the units 124 based on the current operating parameters stored in 616 and projections based on characterization parameters stored in data 612. In the analysis, VPP 110 can operate in an iterative fashion to form a worksheet outlining actions to be taken by each of units 124 to achieve each of the required actions in the requester's set of instructions, or in some cases a close approximation to the required actions in the requester's set of instructions, and whether any of the optional actions in the requester's set of instructions are needed in order to fulfill the request. In some embodiments, analysis 606 may consider not just the current state of the set of units 124, but also a projected future state at the time that individual instructions are to be executed based on the current operating parameters and the characterization parameters.

VPP 110, in analysis state 606, may determine whether or not a particular set of instructions can be fulfilled, and the set of instructions to individual units 124 that will fulfill the requester's set of instructions, in any fashion. In some embodiments, VPP 110 determines the minimal number of "may" rules in the requester's instruction set that will allow fulfillment of the "must" rules in the requester's instruction set. In some embodiments, a best fit algorithm can be performed to determining a minimal set of "may" rules to be performed which results in an acceptable set of "must" rules, or modified "must" rules, that result. As such, a solution may be determined that performs the "must" rules in the instruction set as fully as possible given the set of units 124 and their current states.

While analyzing whether or not the set of instructions can be executed, analysis 606 forms a worksheet in data 618 with individual instructions for individual ones of units 124 and VPP 110 can report back through requester communication state 604 that the required actions can be executed.

Instructions in the worksheet to individual ones of units 124 can include any instruction capable of being performed by an individual unit 124. For example, if the unit 124 is an edge unit 104 as illustrated in FIG. 2, then the instructions can include commands to store or discharge stored energy in storage 218, to generate power using any of the power generations included in generator 216, to discharge or receive power onto grid 102, or to adjust the parameters of load 206 to reduce or increase power discharged without load 206. For example, in some cases a particular edge unit 104 may be instructed to store energy from grid 102 in order that it may be discharged at a later time. While VPP 110 is in the analysis state 606, instructions are not sent to individual units. Instead, the worksheet is a demonstration of the ability to perform the requested set of instructions.

If in analysis state 606, VPP 110 determines that the set of instructions can be performed, then VPP 110 reports that result back to the requester through communication state 604. If in analysis state 606, VPP 110 determines that the set of instructions cannot be performed by the set of units 124, that result is also reported back to the requester through communication state 604.

The requester then may request that the set of instructions, which VPP 110 has determined can be performed, to be actually executed. In that case, control 602 again transitions to analysis 606 to determine whether the set of instructions can still be performed or whether changing conditions in either the characterization parameters or the current state of units 124 has changed since the previous analysis was performed. Analysis 606 once again builds a worksheet of instructions to individual units 124 and determines whether or not the instructions can be performed. If not, then VPP 110 reports that inability back to the requester through communication 604. If the instructions can be performed, then VPP 110 transitions to execution state 614. During execution state 614, instructions stored in the worksheet of data 618 are sent through communication state 608 to individual units 124 for execution.

Control 602 then continues to monitor performance of the instructions by receiving reports of current state parameters, current operating parameters, and characterization parameters from each of units 124. If there is a change in conditions, control 602 may again provide an analysis from analysis 606 and report that it is or is not still possible to perform the instruction set. In some embodiments, one change of conditions of a unit 124 may be the loss of communications connection with a particular unit 124.

VPP 110 may be capable of providing load shaping protocols. For example, requests to VPP 110 may include requests related to peak load reduction, price point reduction, load shifting, wear and usage considerations or other load considerations. VPP 110 may also execute rules associated with restrictive priorities, best fit algorithms, iterative schedule, prioritization of activities, and demand flattening algorithms.

Requests to VPP 110 can include daily dispatch scheduling, which often be divided into two distinct parts: requests oriented towards grid requirements, for example power or energy smoothing requests, or to consumer requirements, which often involve bill reductions or energy shifting activities. Daily Dispatch Scheduling includes having VPP units 124 acting as spinning reserve, participating in markets, or otherwise functioning collectively to affect the request.

Daily Dispatch Scheduling is often a set of requests that are executed on each calendar day, the start of which is determined by the time zone associated with the individual group of VPP units 124. A daily dispatch schedule can typically have four primary periods during the associated calendar day: a charging period, a wait period, a dispatch period, and a post-dispatch period. During the charge period, VPP units 124 are expected to charge the batteries in storage 218 either from the grid or from PV The request for this period is often is of the form "The battery must be fully charged by [time t]." During the wait period, VPP units 124 are expected to hold the battery at or near fully charged, to be ready for the next period. Any generated power (for example by photovoltaics or wind turbines) should be passed through to load 106 and/or grid 102. During the dispatch period, VPP units 124 is expected to dispatch as directed. During the postdispatch period, VPP units 124 are expected to either do nothing (eg; pass through generated power to grid 102 or load 106), or to get ready for the next daily dispatch schedule by charging storage 218 from the internal generator 216.

The daily dispatch schedule specifies the behavior during each of these periods using a number of parameters, some of which are discussed here. One skilled in the art will recognize that other parameters can be used in VPP 110 to specify behavior of VPP units 124. Enable Daily Dispatch is a boolean parameter that, when set, allows the defined schedule to "take over" all functionality for the VPP units 124 specified by the schedule. When a particular VPP unit 124 is not charging or discharging as needed, it will pass all generated power from generators 216 through to load 106 or grid 102. If this Enable Daily Dispatch flag is false, the VPP units 124 will instead behave according to their individual programming.

A Charge Period parameter can include an End Time by which the group should be "fully charged" and should enter into the wait period. The Charge Period parameter may include several sub parameters that, for example, include a Max Individual Unit Grid Charge Rate that is a limit in kW on the maximum allowable power that can be pulled from the grid per VPP unit 124. The Max Individual Unit Grid Charge Rate may be an optional parameter and may default to no limit. The Charge Period parameter may further include a Max Group Grid Charge Rate that provides a limit in kW on the maximum allowable power that can be pulled from grid 102 by VPP units 124 in the group. The Max Group Grid Charge Rate may be optional and may default to no limit. The Charge Period parameter may further include a set of Enable Generator Charge flags that enable charging from each generator (PV, wind, other) included in generators 216. Further, an Enable Grid Charge flag enables charging from grid 102.

Dispatch Period parameters may include a Start Time, which is the time at which the group of VPP units 124 should start discharging, and an End Time, which is the time at which the group of VPP units 124 should stop discharging. The Dispatch Period parameters may include an Enable Dispatch, which is a Boolean flag that enables discharging.

The Dispatch Period parameters may include a Dispatch Mode, which may be one of "max", "smooth", or "set". In "max" mode, the set of PV units 124 will dispatch all VPP units 124 at max power until End Time is reached or they each run out of power. In "smooth" mode, all VPP units 124 will dispatch to run out of dispatchable power when End Time is reached. In "set" mode, VPP units 124 are directed to dispatch power at a set kW rate, distributed across all VPP units 124. If "set" is provided, the kW rate ("Set Rate") is also provided for each of VPP units 124.

The Dispatch Period parameters may also include a Generator Handling Mode. As discussed above, generator 216 may include one or more generators, including PV, wind, or other generators. The Generator Handling Mode may include parameters directed toward each of the generators in generators 216. A Generator flag indicates whether a particular generator can be used to satisfy dispatch requirements. A Generator Use IF Required Flag can indicate that one or more of the generators in generators 216 cannot be used to satisfy dispatch requirements, unless generator output plus dispatch requirements exceeds inverter capacity; in this case, the generators indicated can be used to satisfy dispatch requirements. A Disable Generator If Required flag can be set indicating that the generator cannot be used to satisfy dispatch requirements, even if the generator output plus dispatch requirements exceeds inverter capacity; in this case, in which case the generators are disabled.

By appropriately managing the setting and unsetting of the parameters described above, different behaviors can be created. For example, a charge period and dispatch period can be fully specified, allowing for market oriented or grid requirements. A charge period can be specified, with the details of the dispatch period only being filled in and enabled at the required time. This allows for spinning reserve. The entire schedule could be disabled until a specific time, at which point it could be enabled with a full day dispatch enabled and set to "max". This would allow for emergency dispatch.

Power/Energy Smoothing can also be used. Such smoothing can be oriented towards reducing energy consumption as far as possible during specific periods of the day. Before this period, energy may be stored in units 124 during the period, power may be released during a dispatch period. During a specific period of the day (or all day), the consumption by grid 102 may be preserved to be as flat as possible.

Whether in the form of a daily dispatch or other request, requester 112 may provide requests to VPP 110. VPP 110 determines whether or not the schedule requested by requester 112 can be provided by VPP units 124 or not. If the schedule requested by requester 112 can be provided, then VPP units 124 are provided with individual schedules according to a worksheet generated by VPP 110.

Figure 7A:
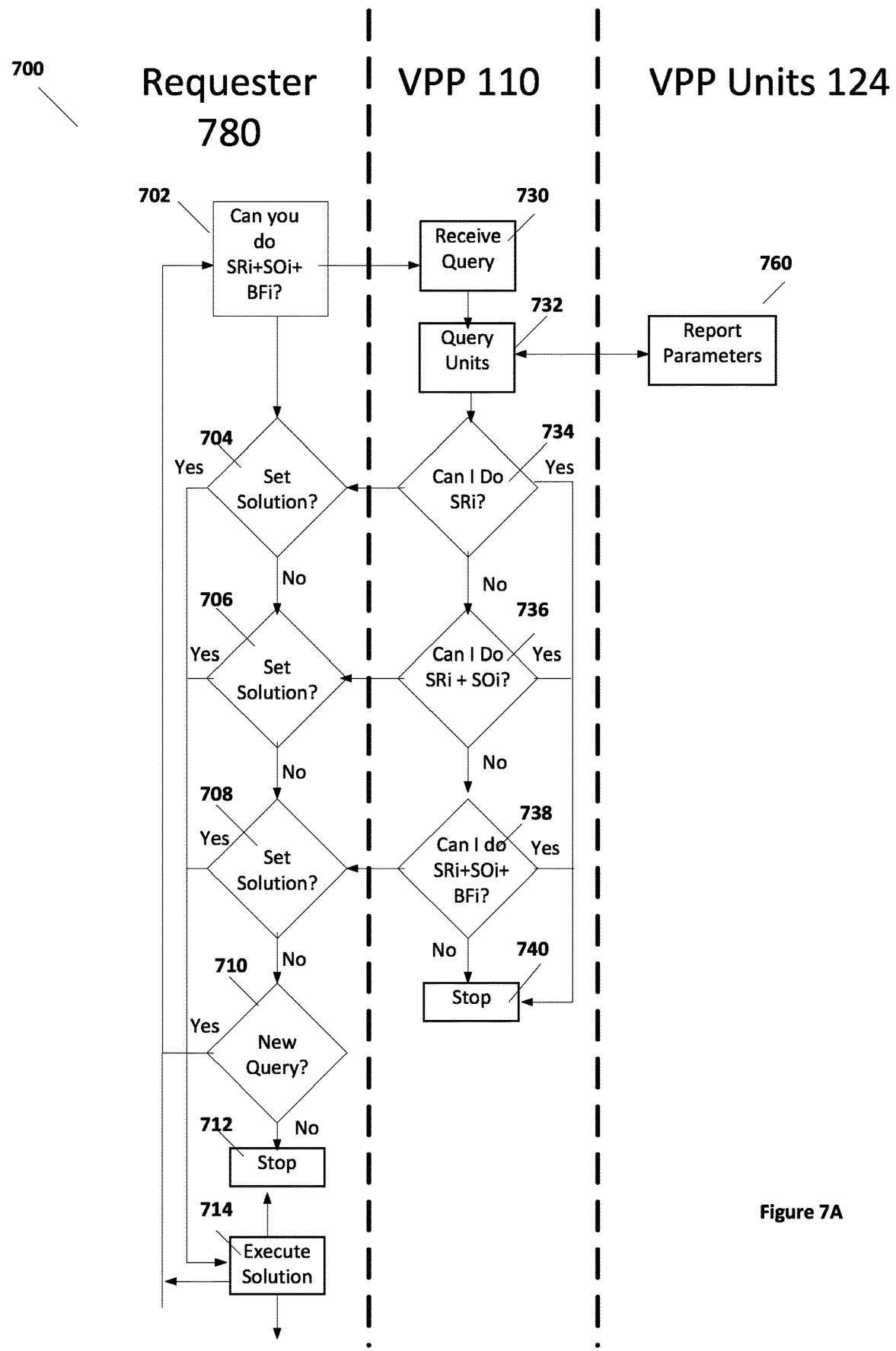
FIGS. 7A and 7B illustrate interactions between a requester, a VPP, and one of a plurality of distributed power units as illustrated in FIG. 1.
Figure 7B:
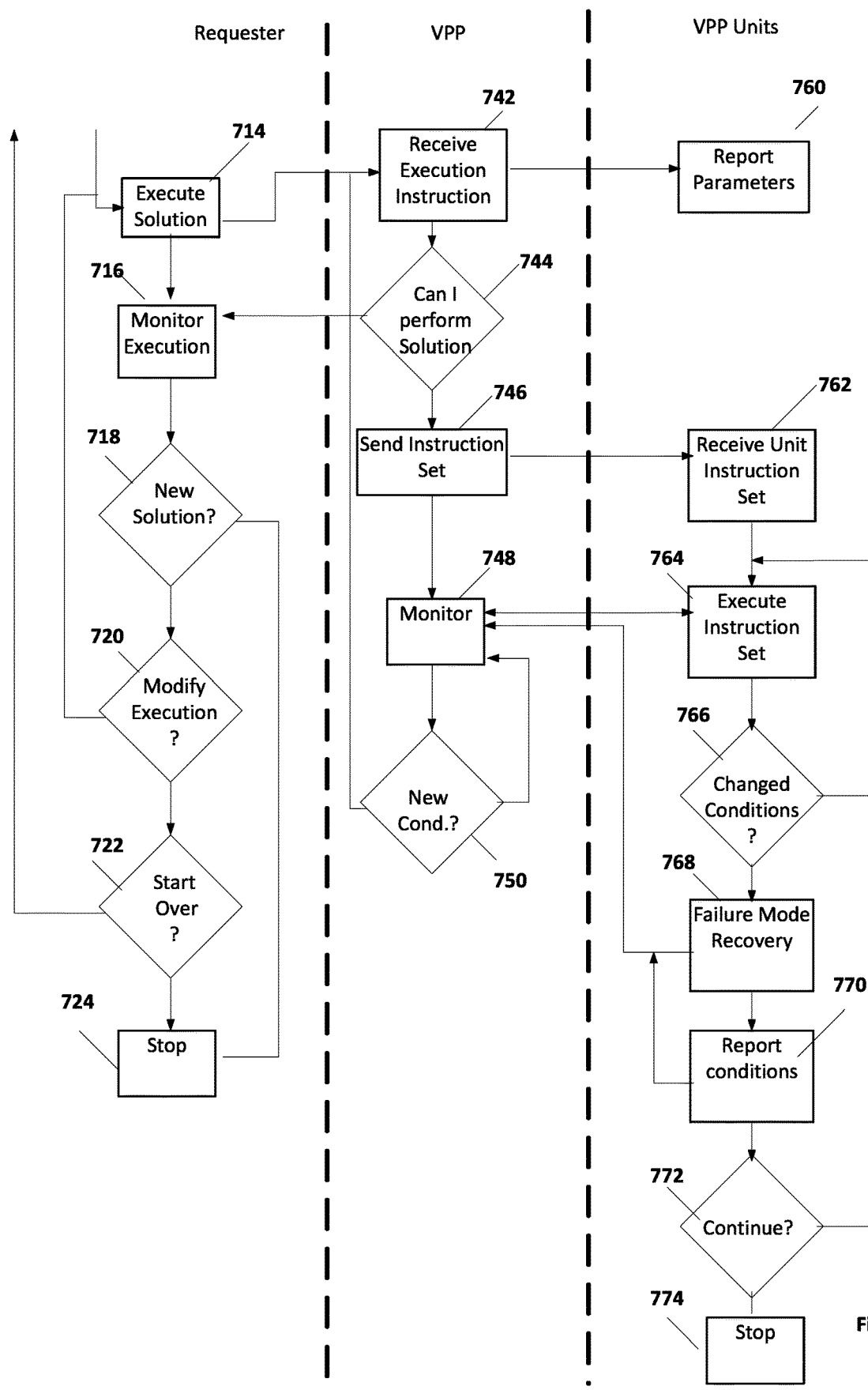

FIGS. 7A and 7B illustrates an example of the interaction 700 between a VPP 110, a requester 780, and individual VPP units 124 according to some embodiments. As shown in FIG. 7A, the actions of the requester 780, the VPP 110, and the VPP units 124 are separated by the dashed lines. The Requester 780 may be any requester, for example an individual, another VPP unit such as VPP 114, or another device. As an example, VPP 110 as shown in FIG. 1 is illustrated. As an example, VPP units 124 as shown in FIG. 1 is illustrated. As discussed above, VPP 114 is illustrated as device 400 in FIG. 4 and the state diagram 600 illustrated in FIG. 6. VPP units 124 are illustrated as edge units 124 shown in FIG. 2 and state diagram 300 shown in FIG. 3 or device 400 illustrated in FIG. 4 and state diagram 500 shown in FIG. 5 coupled with edge units 124 and state diagram 300.

As shown in FIG. 7A, the process is initiated in step 702 when Requester 780 queries VPP 110 with an instruction set including a set of rules. As is illustrated in step 702, the query can be of the form "Can You Do the instruction set{Set of Required Rules (SR)}$_i$, {Set of Optional Rules (SO)}$_i$, {Set of Best Fit Criteria (BF)}$_i$,". As discussed above, the instruction set includes a set of required rules {SR}, which are "must do" rules, and a set of optional rules {SO}, which are "may do" rules. The instruction set may also include a set of best fit criteria rules {BF} to be used if the instruction set cannot be completed in its original form. The sets of rules can be indexed to determine how many sets of rules have been analyzed. An example form of instruction set is provided in Table III below. Any number of rules providing for any number of actions can be provided in an instruction set.

TABLE III

Instruction Set

| Rule Number | Rule |
|---|---|
| 1 | SR Must discharge X1 starting at time T1 and finishing at time T2, priority 10 |
| 2 | SR Must charge Y1 starting at time T3 and finishing at time T4, priority 5 |
| 3 | SR Must do nothing starting at time T5 and finishing at time T6, priority 1 |
| 4 | SO May generate X2 during time T1 and time T2 |
| 5 | SO May generate and store Y2 during time T2 and T3 |
| 6 | SO May store power starting at time T4 and ending at time T5 |
| 7 | BF Best Fit must perform priority >5 |
| Etc. | Etc. |

The instruction set is received by VPP 110 in receive query 730. As discussed above, before an analysis of whether or not the instruction set can be accomplished, VPP 110 may query units 124 to determine their current parameter sets (Current state parameters, current operating parameters, and characterization parameters) in step 732. In step 760, each of VPP units 124 responds to the query made by VPP 110 in step 732 and provides the requested parameters. In some embodiments, VPP 110 may receive reports from units 124 on a periodic basis with updated sets of parameters during the analysis.

VPP 110, with a current set of parameters, then proceeds to step 734. In step 734, VPP 110 transitions to analysis state 606 to determine whether or not the set of required rules {SR}$_i$ can be implemented given the current and probable future states of units 124. While undergoing this analysis, VPP 110 creates and stores in data 618 a worksheet with instructions for each individual ones of units 124 that will accomplish the set of required rules {SR}$_i$. The results of that analysis are reported to step 704 in the requester 780. If the set of required rules {SR}$_i$ can be performed, then VPP 110 proceeds to stop 740 and awaits further instructions while requester 780 proceeds from step 704 to execute solution step 714.

If VPP 110 determines that the set of required rules {SR}$_i$ cannot by themselves be performed given the current state of units 124, then VPP 110 proceeds to step 736. In step 736, VPP 110 determines whether or not the required rules {SR}$_i$ can be performed if some or all of the set of optional rules {SO}$_i$ are performed as well. Optional rules {SO}$_i$ may include, for example, instructions to receive power from power grid 102 and store energy in storage 218 prior to performance of a required rule for providing power to grid 102, generate power using one or more generators in generator 216 to store in storage 218 in anticipation of a required rule to provide power to grid 102, reduce load 206 to preserve power in order to fulfill a required rule to provide power to grid 102, provide power to grid 102 or load 206 in order to provide storage for a required rule to store energy in storage 218, or other such rule. In some embodiments, however, VPP 110 may determine whether performing some or all of the optional rules {SO}$_i$ allows performance of the set of required rules {SR}$_i$.

Typically, performance of each rule in the set of optional rules {SO}$_i$ has a cost associated with that performance. For example, there are fuel costs of running generators, power costs of storing energy from power grid 102, additional power usage costs of increasing load 206, or other actions. Consequently, in some embodiments in step 736, VPP 110 determines whether there are a minimum number of the set of optional rules {SO}$_i$ that need to be performed in order to allow performance of the set of required rules {SR}$_i$. During the analysis, VPP 110 again provides a worksheet for instructions for each of units 124 that allows completion of the set of required rules {SR}$_i$ and those of the set of optional rules {SO}$_i$ used to allow completion of the set of required rules {SR}$_i$.

Whether or not the set of required rules {SR}$_i$ can be performed with performance of one or more of the set of optional rules {SO}$_i$ is reported to requester 780 and received in step 706 of requester 780. If the analysis indicates that the set of required rules {SR}$_i$ (with performance of one or more of the set of optional rules {SO}$_i$) can be performed by units 124, then VPP 110 proceeds to step 740 and requester 780 proceeds to step 714. However, if VPP 110 determines in analysis state 606 that the set of required rules {SR}$_i$ cannot be performed, even if all of the set of optional rules {SO}$_i$ are performed, then VPP 110 proceeds to step 738 and requester 780 proceeds to step 708.

In step 738, VPP 110 operating in analysis state 606 considers whether or not an approximate solution can be reached that performs most of the set of required rules {SR}$_i$. As discussed above, the set of required rules {SR}$_i$, in some cases, can be ranked as to priority. In that fashion, VPP 110 can determine which rules of the set of required rules {SR}$_i$ can be modified or neglected in forming a solution. Furthermore, requester 780 can provide a set of best-fit criteria rules {BF}$_i$ that determine the scope of acceptable solutions that do not perform all of the set of required rules {SR}$_i$ or that perform some of the rules in the set of required rules {SR}$_I$ only partially. In some embodiments, the best-fit criteria may include rules regarding which of the required rules {SR} must be performed, as indicated by the priority of the rule provided in the instruction set. In step 738, VPP 110 can provide a best-fit solution that is closest to accomplishing the rules in the set of required rules {SR}$_i$ while performing at least some of the set of optional rules {SO}$_i$ and falls within the requirements set by the set of best-fit criteria rules {BF}$_i$. VPP 110 then reports to step 708 whether or not that solution can be performed and reports the set of modified rules {MR}$_i$ that can be performed that best approximates the set of rules that were presented. The results are then reported to requester 780 at step 708.

In VPP 110, after the analysis in step 738 is completed, VPP 110 proceeds to stop step 740. In which case, VPP 110 is in control and monitor state 602 and is essentially idled while continuing to monitor and update the parameters in current state data 610, operating parameters data 616, and characterization parameters data 612.

In requester 780 at step 708, if a VPP 110 has presented a solution that falls within the set of best-fit requirement rules {BF}$_i$, then requester 780 proceeds to execute solution step 714. If not, then requester 780 proceeds to step 710 where a decision is made whether to present VPP 110 with another request. If the decision in step 710 is to provide a new request, then requester 780 proceeds to step 702 where a next request (iteration i+1) is prepared for presentation to VPP 110. If the decision is not to proceed, the requester proceeds to step 712 and stops.

In step 714, requester determines whether or not to proceed with the solution presented by VPP 110. As discussed above, the solution may include performance of the set of required rules {SR}$_i$ with none of the set of optional rules {SO}$_i$, performance of the set of required rules {SR}$_i$ along with one or more rules of the set of optional rules {SO}$_i$, or performance of an approximation to the set of required rules {SR}$_i$ along with some or all of the set of optional rules {SO}$_i$ that adhere to the set of best-fit rules {BF}$_i$. If the decision is not to proceed, then requester may proceed to stop step 712. If the decision is to present a different request, then requester may proceed to step 702 where another iteration (iteration i+1) of request is presented to VPP 110. If the decision is to proceed with the current solution, then as shown in FIG. 7B requester 780, in step 714, presents the solution to step 742 of VPP 110 for execution. Requester 780 then proceeds to monitor step 716.

In step 742, when a request to execute is received, VPP 110 queries units 124 to retrieve a current set of parameters. Units 124 receive the query in step 760 and transitions to check unit state 308 to retrieve and update the current state and then reports through communications state 318 back to VPP 110 all of the parameters for each one of units 124. VPP 110 then transitions to step 744.

In step 744, VPP 110 once again transitions to analysis state 606 to determine if the set of rules in the solution presented for execution can be performed or not given the current conditions of units 124. The solution again is of the form {SR}+{SO} and adheres to the set of best fit rules {BF}. VPP 110, in analysis state 606, again executes step 734, 736, and 738 to determine first if the set of required rules {SR} can be performed alone, then if the set of required rules {SR} can be performed with performance of one or more of the set of optional rules {SO}, and finally if a best approximation to the set of required rules {SR} can be performed with performance of one or more of the set of optional rules {SO} can be formed that falls within the set of best-fit rules {BF}. Once again, a worksheet is formed, or the worksheet formed in the previous analysis can be modified, and stored in worksheet data 618. As illustrated in FIG. 7B, the results of this analysis are reported back to monitor function 716 of requester 780.

In requester 780, if monitor execution 716 receives a result that the solution cannot be performed as presented during the original analysis step illustrated in FIG. 7A, requester 780 proceeds to step 718 to determine if a new solution should be proposed or not. If no new solution is to be proposed, then requester proceeds to stop 724. If a new solution is to be proposed, then the solution is derived in step 720. Step 720 also decides whether or not to proceed to execute solution 714 with the new solution or start the process completely over with step 702. If, in step 722, it is decided not to propose a new solution and not to start over, the requester 780 proceeds to stop step 724.

In VPP 110, if step 744 has reported that the solution proposed during the original analysis step can be executed, the instruction set for each of units 124 that is stored in the worksheet of worksheet data 618 is sent to units 124 in step 746, which transitions VPP 110 to execution state 614 for transmission of the individual instructions. As discussed above, during analysis state 606 a worksheet is constructed that includes individual instructions for each of units 124-1 through 124-(N−m). An example of such a worksheet for the case that the set of required rules {SR} presented in Table III can be performed is provided in the following Table IV:

TABLE IV

| Worksheet | | | |
|---|---|---|---|
| Unit 124-1 | Unit 124-2 | ... | Unit 124-(N-m) |
| @time T1, discharge X1 for duration $t_1$ | @time T1 + t, discharge X1 for duration $t_2$ | | @time T1 + $t_1$ + $t_2$ ... $t_{N-m-1}$, discharge X1 until time T2 |
| @time T3, charge to total charge $Y1_1$ or until time T4 | @time T3, charge to total charge $Y1_2$ or until time T4 | | @time T3, charge to total charge $Y1_{(N-m)}$ or until time T4 |
| @time T5, do nothing until time T6 | @time T5, do nothing until time T6 | | @time T5, do nothing until time T6 |

As shown in FIG. 7B, each unit 124 receives its instruction set in step 762. As shown in FIG. 3, the instruction set is stored in set data 320 and control and monitor 302 operates unit 124 according to the instructions stored in set data 320 in step 763. As is illustrated in FIG. 7B, from execute step 764, unit 124 continuously checks for changed conditions. In step 766, if there is no changed condition, then unit 124 continues to report and monitor in step 764 (control and monitor state 302). If, however, a condition in unit 124 has changed, then unit 124 proceeds to failure mode recovery 768 (transitions to failure recovery 314 in FIG. 3).

In step 770, the new conditions are reported to monitor step 748 in step 770. As discussed above, VPP 110 may determine that a new set of instructions is warranted in step 750 and proceed to step 742. In some cases, however, unit 124 can continue to fulfill the instructions in stored in instructions set 320. In step 772 of unit 124, unit 124 decides whether or not it can proceed. If unit 124 can proceed, then it returns to step 764 to continue executing the instruction set in instruction set 320. If not, then unit 124 can proceed to stop step 774 to await new instructions.

In some cases, in monitor step 748 VPP 110 may determine that communications has been lost to a particular one of unit 124. In that case, expecting that particular one of unit 124 to be not performing its instruction set, VPP 110 may return to step 744 to determine if the execution instructions can still be performed. If they can, then a new worksheet can be provided that does not utilize the lost one of unit 124 and the new instruction sets are transmitted to the VPP units 124 in step 746. If the instruction set cannot be performed without the lost one of units 124, then step 744 reports that condition to step 716 of requester 780, which responds as discussed above.

The above detailed description is provided to illustrate specific embodiments of the present invention and is not intended to be limiting. Numerous variations and modifications within the scope of the present invention are possible. The present invention is set forth in the following claims.

What is claimed is:

1. A method of operating as a virtual power plant, comprising:
receiving a request from a requester, the request being associated with transfer of power with a power grid;
determining whether the request can be performed by a set of units, the set of units each including one or more edge units coupled to receive and supply power to the power grid, each edge unit including
a power distribution section that includes a power grid interface and at least one of a power generation interface, a power storage interface, and a load power interface, and
a processing unit that controls and monitors the power distribution section and communicates a set of characteristic parameters and current state parameters that characterize the edge unit to the virtual power plant that are used in determining whether the request can be performed by the set of units, the processor determining from multiple set of instructions a particular set to execute to control the power distribution section,
wherein determining whether the request can be performed includes comparing the request against unit characterization parameters formed from the set of characteristic parameters and current state parameters from each of one or more edge units;
reporting the result of whether the request can be performed to the requester; and
if a subsequent execution request is received from the requester, then executing the request by providing instructions to each of the set of units to perform the request.

2. The method of claim 1, wherein the request includes an instruction set that includes a sequence of rules to be performed at certain times, each rule outlining whether the rule to be implemented is mandatory or permissive, the action to be taken, what time and duration the action is to be taken, and the priority level of the action.

3. The method of claim 2, wherein determining whether the request can be performed by the set of units includes determining whether the sequence of rules that are mandator in the instruction set can be performed by the set of units.

4. The method of claim 3, wherein determining whether the request can be performed by the set of units includes creating a worksheet of instructions to individual units in the set of units based on current state parameters and characterization parameters of each of the set of units.

5. The method of claim 3, wherein determining whether the request can be performed by the set of units includes, if the set of rules that are mandatory alone cannot be performed by the set of units, determining whether performance of one or more of a set of rules that are permissive allows performance of the set of rules that are mandatory.

6. The method of claim 5, wherein determining whether the request can be performed by the set of units includes, if the set of rules that are mandatory cannot be performed with performance of one or more of the set of rules that are permissive, then
determining a best-fit approximation to the set of rules with a minimum set of rules that are permissive to be performed that results in an acceptable set of rules that are mandatory being performed; and
determining whether the best-fit approximation to the set of rules that are mandatory can be performed, the best-fit approximation being consistent with a set of best-fit rules.

7. The method of claim 1, wherein executing the subsequent execution request comprises:
determining whether the subsequent execution request can be performed by the set of units; and
providing instructions to each of the set of units so that the subsequent execution request is fulfilled.

8. The method of claim 7, further including monitoring the set of units during execution of the request;
determining if a condition of one of the set of units has changed; and
determining whether or not the request can be fulfilled in view of the changed condition.

9. The method of claim 8, wherein the changed condition is a failure of one or more edge units that results in a change in the set of characterization parameters and current state parameters of the one or more edge units.

10. The method of claim 8, wherein the new condition includes failure of one or more edge units that results in the one or more edge units becoming non-functional to perform the request.

11. A Virtual Power Plant, comprising:
a processor;
a communications interface coupled to the processor, the communications interface configured to communicate with a set of units, the set of units each including one or more edge units coupled to receive and supply power to a power grid, each edge unit including
a power distribution section that includes a power grid interface and at least one of a power generation interface, a power storage interface, and a load power interface, and
a processing unit that controls and monitors the power distribution section and communicates a set of characteristic parameters and current state parameters that characterize the edge unit to the corresponding unit in the set of units, the processor determining from multiple sets of instructions a particular set of instructions to execute to control the power distribution section,
wherein the virtual power plant receives and compiles unit characterization parameters and current state parameters from the set of characterization parameters and current state parameters from each of the set of units;
a second communications interface coupled to the processor, the second communications interface configured to communicate with a requester to receive a request, the request being associated with transfer of power between the set of units and the power grid; and
a memory coupled to the processor, the memory storing data and instructions to be performed by the processor, the instructions executed by the processor providing instructions for
receiving the request from the requester;

maintaining unit characterization parameters from the set of characteristic parameters and current state parameters from each of the one or more units;

determining whether the request can be performed by the set of units by comparing the request with the set of characteristic parameters and current state parameters from each of the one or more units;

reporting whether or not the request can be performed to the requester; and if a subsequent execution request is received to execute the request from the requester, then executing the request by providing instructions to the set of units.

12. The virtual power plant of claim 11, wherein the request includes an instruction set that includes a sequence of rules to be performed at certain times, each rule outlining whether the rule to be implemented is mandatory or permissive, the action to be taken, what time and duration the action is to be taken, and the priority level of the action.

13. The virtual power plant of claim 12, wherein determining whether the request can be performed by the set of units includes determining whether the sequence of rules that are mandatory in the instruction set can be performed by the set of units.

14. The virtual power plant of claim 13, wherein determining whether the request can be performed by the set of units includes creating a worksheet of instructions to individual units in the set of units based on current state parameters and characterization parameters of each of the set of units.

15. The virtual power plant of claim 13, wherein determining whether the request can be performed by the set of units includes, if the set of rules that are mandatory alone cannot be performed by the set of units, determining whether performance of one or more of a set rules that are permissive allows performance of the set of required rules that are mandatory.

16. The virtual power plant of claim 15, wherein determining whether the request can be performed by the set of units includes, if the set of rules that are mandatory cannot be performed with performance of one or more of the set of rules that are permissive, then determining a best-fit approximation to the set of rules with a minimum set of rules that are permissive to be performed that results in an acceptable set of rules that are mandatory being performed; and determining whether the best-fit approximation to the set of rules that are mandatory can be performed, the best-fit approximation being consistent with a set of best-fit rules.

17. The virtual power plant of claim 11, wherein executing the subsequent execution request comprises:

determining whether the subsequent execution request can be performed by the set of units; and providing instructions to each of the set of units so that the subsequent execution request is fulfilled.

18. The virtual power plant of claim 17, further including monitoring the set of units during execution of the request;

determining if a condition of one of the set of units has changed; and determining whether or not the request can be fulfilled in view of the changed condition.

19. The virtual power plant of claim 18, wherein the new condition is a failure of one or more edge units that results in a change in the set of characterization parameters and current state parameters of the one or more edge units.

20. The virtual power plant of claim 18, wherein the new condition includes failure of one or more edge units that results in the one or more edge units becoming non-functional to perform the request.

* * * * *